US011427473B2

(12) United States Patent
Musso et al.

(10) Patent No.: US 11,427,473 B2
(45) Date of Patent: Aug. 30, 2022

(54) PROCESS FOR THE PRODUCTION OF DISPERSIONS OF THERMALLY OXIDISED CARBON-BASED MATERIALS

(71) Applicants: SCHLUMBERGER TECHNOLOGY CORPORATION, Sugar Land, TX (US); POLITECNICO DI TORINO, Turin (IT)

(72) Inventors: Simone Musso, Cambridge, MA (US); Matteo Pavese, Gassino Torinese (IT); Luca Lavagna, Cuneo (IT)

(73) Assignees: SCHLUMBERGER TECHNOLOGY CORPORATION, Sugar Land, TX (US); POLITECNICO DI TORINO, Turin (IT)

( * ) Notice: Subject to any disclaimer, the term of this patent is extended or adjusted under 35 U.S.C. 154(b) by 625 days.

(21) Appl. No.: 16/320,891

(22) PCT Filed: Jul. 27, 2016

(86) PCT No.: PCT/IT2016/000181
§ 371 (c)(1),
(2) Date: Jan. 25, 2019

(87) PCT Pub. No.: WO2018/020519
PCT Pub. Date: Feb. 1, 2018

(65) Prior Publication Data
US 2019/0161353 A1    May 30, 2019

(51) Int. Cl.
*C01B 32/194* (2017.01)
*C01B 32/174* (2017.01)
(Continued)

(52) U.S. Cl.
CPC ............ *C01B 32/194* (2017.08); *B01J 8/008* (2013.01); *C01B 32/174* (2017.08); *G01N 5/04* (2013.01);
(Continued)

(58) Field of Classification Search
CPC . C01B 32/194; C01B 32/174; C01B 2202/06; G01N 5/04; B01J 8/008;
(Continued)

(56) References Cited

U.S. PATENT DOCUMENTS 10,167,714 B2    1/2019    Musso et al.
2010/0056819 A1    3/2010    Jang et al.

FOREIGN PATENT DOCUMENTS

EP    1226294 A1    7/2002
EP    2404873 A1    1/2012
WO    2015077524 A1    5/2015

OTHER PUBLICATIONS

Chen, Yuan, et al. "Low-defect, purified, narrowly (n, m)-dispersed single-walled carbon nanotubes grown from cobalt-incorporated MCM-41." ACS nano 1.4 (2007): 327-336.*
(Continued)

*Primary Examiner* — Richard M Rump
(74) *Attorney, Agent, or Firm* — Trevor G. Grove (57) ABSTRACT

Methods of preparing dispersions of carbon-based materials are disclosed herein. In some embodiments, a method comprises exposing the carbon-based material to an atmosphere comprising between about 0.5% v/v and about 5.0% v/v of oxygen for a selected time at an oxidation temperature to obtain a thermally oxidized material; and dispersing the thermally oxidized material in a liquid medium.

20 Claims, 9 Drawing Sheets

(51) Int. Cl.
 B01J 8/00 (2006.01)
 G01N 5/04 (2006.01)
(52) U.S. Cl.
 CPC ...... C01B 2202/06 (2013.01); C01P 2002/82 (2013.01); C01P 2004/03 (2013.01); C01P 2004/133 (2013.01); C01P 2004/24 (2013.01); C01P 2006/22 (2013.01)
(58) Field of Classification Search
 CPC .............. C01P 2002/82; C01P 2004/03; C01P 2004/133; C01P 2004/24; C01P 2006/22
 See application file for complete search history.

(56) References Cited

OTHER PUBLICATIONS

Arepalli, Sivaram, et al. "Protocol for the characterization of single-wall carbon nanotube material quality." Carbon 42.8-9 (2004): 1783-1791.*
Mohammadi, Somayeh, Homeira Shariatpanahi, and Faramarz Afshar Taromi. "Influence of hybrid functionalized graphite nanoplatelets-tripolyphosphate on improvement in fire protection of intumescent fire resistive coating for steel structures." Polymer Degradation and Stability 120 (2015): 135-148.*
Andrews, R. et al., "Purification and structural annealing of multiwalled carbon nanotubes at graphitization temperatures", Carbon, 2001, 39(11), pp. 1681-1687.
Aviles, F. et al., "Evaluation of mild acid oxidation treatments for MWCNT functionalization", Carbon, 2009, 47(13), pp. 2970-2975.
Baughman, R. H. et al., "Carbon Nanotubes—the Route Toward Applications", Science, 2002, 297(5582), pp. 787-792.
Bianco, A. et al., "Applications of carbon nanotubes in drug delivery", Current Opinion in Chemical Biology, 2005, 9(6), pp. 674-679.
Brukh, R. et al., "Kinetics of carbon nanotube oxidation", Journal of Materials Chemistry, 2007, 17(7), pp. 619-623.
Chen, X. et al., "Controlled thermal functionalization for dispersion enhancement of multi-wall carbon nanotubes in organic solvents", Journal of Materials Science, 2016, 51(12), pp. 5625-5634.
Chiang, I. W. et al., "Purification and Characterization of Single-Wall Carbon Nanotubes (SWNTs) Obtained from the Gas-Phase Decomposition of CO (HiPco Process)", Journal of Physical Chemistry B, 2001, 105(35), pp. 8297-8301.
Chiang, I. W. et al., "Purification and Characterization of Single-Wall Carbon Nanotubes", Journal of Physical Chemistry B., 2001, 105(6), pp. 1157-1161.
Chiang, Y.-C, et al., "The influence of treatment duration on multiwalled carbon nanotubes functionalized by H2SO4/HNO3 oxidation", Applied Surface Science, 2011, 257(6), pp. 2401-2410.
Chieu, T. C. et al., "Raman studies of benzene-derived graphite fibers", Physical Review B, 1982, 26(10), pp. 5867-5877.
Datsyuk, V. et al., "Chemical oxidation of multiwalled carbon nanotubes", Carbon, 2008, 46(6), pp. 833-840.
Dresselhaus, M. S. et al., "Raman spectroscopy on isolated single wall carbon nanotubes", Carbon, 2002, 40(12), pp. 2043-2061.
Dresselhaus, M. S. et al., "Raman spectroscopy of carbon nanotubes", Physics Reports, 2005, 409(2), pp. 47-99.
Hou, P. X., et al., "Multi-step purification of carbon nanotubes", Carbon, 2002, 40(1), pp. 81-85.
Hou, P. X., et al., "Purification of carbon nanotubes", Carbon, 2008, 46(15), pp. 2003-2025.
Huang, W. et al., "99.9% purity multi-walled carbon nanotubes by vacuum high-temperature annealing", Carbon, 2003, 41(13), pp. 2585-2590.
Hummers, Jr., W. S., et al., "Preparation of Graphitic Oxide", Journal of the American Chemical Society, 1958, 80(6), pp. 1339 (1 page).
Lee, Y.-J., "The second order Raman spectroscopy in carbon crystallinity", Journal of Nuclear Materials, 2004, 325(2-3), pp. 174-179.
Li, C. et al., "Oxidation of multiwalled carbon nanotubes by air: benefits for electric double layer capacitors", Journal of Powder Technologies, 2004, 142(2-3), pp. 175-179.
Li-Pook-Than, A. et al., "Type- and Species-Selective Air Etching of Single-Walled Carbon Nanotubes Tracked with in Situ Raman Spectroscopy", ACS Nano, 2013, 7(8), pp. 6507-6521.
Mawhinney, D. B., et al., "Infared Spectral Evidence for the Etching of Carbon Nanotubes: Ozone Oxidation at 298 K", Journal of American Chemical Society, 2000, 122(10), pp. 2383-2384.
Musso, S. et al., "Influence of carbon nanotubes structure on the mechanical behavior of cement composites", Composites Science and Technology, 1990, 69(11-12), pp. 1985-1990.
Osorio, A. G. et al., "H2SO4/HNO3/HCl—Functionalization and its effect on dispersion of carbon nanotubes in aqueous media", Applied Surface Science, 2008, 255(5—Part 1), pp. 2485-2489.
Park, Y. S. et al., "High yield purification of multiwalled carbon nanotubes by slective oxidation during thermal annealing", Carbon, 2001, 39(5), pp. 655-661.
Peng, Y. et al., "Effects of Oxidation by Hydrogen Peroxide on the Structures of Multiwalled Carbon Nanotubes", Industrial & Engineering Chemistry Research, 2006, 45(19), pp. 6483-6488.
Rosca, I. D. et al., "Oxidation of multiwalled carbon nanotubes by nitric acid", Carbon, 2005, 43(15), pp. 3124-3131.
Saleh, T. A., et al., "The influence of treatment temperature on the acidity of MWCNT oxidized by HNO3 or a mixture of HNO3/H2SO4", Applied Surface Science, 2011, 257(17), pp. 7746-7751.
Sato, Y. et al., "Raman spectra of carbons of 2600-3300 cm-1 region", Carbon, 1979, 16(4), pp. 279-280.
Sen, R. et al., "Controlled Purification of Single-Walled Carbon Nanotube Films by Use of Selective Oxidation and Near-IR Spectroscopy", Chemistry of Materials, 2003, 15(22), pp. 4273-4279.
Smith Jr., M. R. et al., "Selective oxidation of single-walled carbon nanotubes using carbon dioxide", Carbon, 2003, 41(6), pp. 1221-1230.
Sun, Y.-P et al., Functionalized Carbon Nanotubes: Properties and Applications, Accounts of Chemical Research, 2002, 35(12), pp. 1096-1104.
Tunistra, F. et al., "Raman Spectrum of Graphite", The Journal of Chemical Physics, 1970, 53, pp. 1126-1130.
Vidano, R., "New Lines in the Raman Spectra of Carbons and Graphite", Journal of the American Ceramic Society, 1978, 61(1-2), pp. 13-17.
Wepasnick, K. A., et al., "Surface and structural characterization of multi-walled carbon nanotubes following different oxidative treatments", Carbon, 2011, 49(1), pp. 24-36.
Wu, H.-C. et al., "Chemistry of carbon nanotubes in biomedical applications", Journal of Materials Chemistry, 2010, 20, pp. 1036-1052.
Xia, W. et al., "A highly efficient gas-phase route for the oxygen functionalization of carbon nanotubes based on nitric acid vapor", Carbon, 2009, 47(3), pp. 919-922.
Zhang, J. et al., "Effect of Chemical Oxidation on the Structure of Single-Walled Carbon Nanotubes", Journal of Physical Chemistry B, 2003, 107(16), pp. 3712-3718.
Zhou, J. et al., "Diffusion of Metal in a Confined Nanospace of Carbon Nanotubes Induced by Air Oxidation", Journal of American Chemical Society, 2010, 132(33), pp. 11402-11405.
Partial Search Report issued in PCT Application No. PCT/IT2016/000181 dated Mar. 20, 2017, 7 pages.
Search Report and Written Opinion of related International Patent Application No. PCT/IT2016/000181 dated May 12, 2017, 17 pages.
International Preliminary Report on Patentability issued in PCT Application No. PCT/IT2016/000181 dated Jan. 29, 2019, 11 pages.

* cited by examiner

PROCESS FOR THE PRODUCTION OF DISPERSIONS OF THERMALLY OXIDISED CARBON-BASED MATERIALS

FIELD

The present disclosure is directed to the thermal oxidation of carbon-based materials, and more particularly to dispersions of thermally oxidized carbon-based materials and methods of making same.

BACKGROUND

Carbon-based materials, such as carbon nanotubes, graphene nanoplatelets, and the like, can be used as additives to improve the properties of materials. For example, WO 20015/077524, the disclosure of which is incorporated herein by reference, describes the use of carbon-based materials to improve electrical conductivity in cement or cement composites. Carbon-based materials have also been added to polymers or resins to improve thermal or electrical conductivity, permeability, and mechanical properties, such as strength, stiffness or surface toughness. (see *Science* 297, 787-792 (2002); *Chem. Biol.* 9, 674-679 (2005); *Chem. Res.* 35, 1096-1104 (2002); *Compos. Sci. Technol.* 69, 1985-1990 (2009))

Among the deficiencies that limit the use of carbon-based materials as additives are their hydrophobicity and their tendency to aggregate. Accordingly, improved methods for dispersing carbon-based materials in aqueous media are described.

SUMMARY

In some embodiments, a method of preparing a dispersion of a carbon-based material comprises exposing the carbon-based material to an atmosphere comprising between about 0.5% v/v and about 5.0% v/v of oxygen for a selected time at an oxidation temperature to obtain a thermally oxidized material; and dispersing the thermally oxidized material in a liquid medium.

In some embodiments, the selected time is between about 10 minutes and about 2 hours.

In some embodiments, the oxidizing temperature is between about 350° C. and about 425° C.

In some embodiments, the carbon-based material is a multi-layered graphene or graphene-like material.

In some embodiments, the carbon-based material is selected from the group consisting of multi-walled carbon nanotubes, graphene, and graphene nanoplatelets.

In some embodiments, the atmosphere includes an oxidizing gas selected from the group consisting of air, oxygen ($O_2$), nitrogen ($N_2$), carbon monoxide (CO), nitrogen monoxide (NO), sulfur monoxide (SO), sulfur dioxide ($SO_2$), and combinations thereof.

In some embodiments, the atmosphere includes at least one second gas.

In some embodiments, the second gas is selected from the group consisting of nitrogen ($N_2$), argon (Ar), helium (He), carbon dioxide ($CO_2$), and combinations thereof.

In some embodiments, the atmosphere includes between about 80% v/v and about 99.5% v/v of the second gas.

In some embodiments, the atmosphere includes about 8% v/v nitrogen ($N_2$), and about 90% v/v of argon (Ar)

In some embodiments, the method further comprises determining the oxidizing temperature prior to the exposing.

In some embodiments, the determining comprises exposing a test sample of the carbon-based material having a known initial weight to the atmosphere; heating the test sample at a heating rate from an initial temperature below the temperature at which the carbon-based material oxidizes to a final temperature above the temperature at which the carbon-based material oxidizes; and weighing the test sample during the heating at a plurality of temperatures between the initial temperature and the final temperature, wherein a temperature increment between each weighing is about 10° C. or less; determining as a threshold temperature the first temperature at which the weight of the test sample is less than the initial weight; and selecting as the oxidizing temperature a temperature that is between about 50° C. and about 100° C. below the threshold temperature.

In some embodiments, the temperature increment between each weighing is between about 1° C. and about 5° C.

In some embodiments, the weight of the test sample at the threshold temperature is less than about 1 wt % less than the initial weight of the test sample.

In some embodiments, the oxidation temperature is between about 350° C. and about 425° C.

In some embodiments, the heating rate is between about 1° C./min. and about 10° C./min.

In some embodiments, the dispersing include sonicating the thermally oxidized material in the liquid medium.

In some embodiments, the liquid medium is water.

In some embodiments, a concentration of the thermally oxidized material in the liquid medium is between about 5 wt % and about 10 wt % of the total weight of the liquid medium.

In some embodiments, a method of preparing a dispersion of a carbon-based material comprises determining a threshold temperature at which a specific carbon-based material begins to oxidize in a given atmosphere; exposing the carbon-based material to the given atmosphere at an oxidation temperature less than the threshold temperature for a time sufficient to at least partially oxidize the carbon-based material; and dispersing the at least partially oxidized carbon-based material in an aqueous medium.

BRIEF DESCRIPTION OF THE DRAWINGS

These and other features of the disclosure will become more apparent from the following description in which reference is made to the appended drawings, wherein.

DETAILED DESCRIPTION

Methods for the preparation of stable dispersions of thermally oxidized multi-walled carbon-based materials are disclosed herein. The resultant dispersions can be utilized as additives in composite materials, such as polymers, cements, and the like. The dispersed materials may also serve as a precursor to subsequent chemical reactions which may not be accessible to or as efficient with non-dispersed materials. The dispersed material can also create advantages for chemical functionalization. For example, wet functionalization needs a surface that is easily attachable. The dispersed materials can avoid the formation of aggregates and increase the interaction between the surface of the dispersed materials and reactants.

The percentages and ratios used herein are by weight of the total composition and measurements made are at about room temperature and normal pressure unless otherwise designated. "Room temperature" as defined herein means a temperature between about 22° C. and about 26° C. Temperatures are in degrees Celsius unless specified otherwise.

Ranges recited herein may include the endpoints, including those that recite a range "between" two values. It should be further understood that a description in range format is merely for convenience and brevity and should not be construed as an inflexible limitation on the scope of the invention. Accordingly, the description of a range should be considered to have specifically disclosed all the possible sub-ranges as well as individual numerical values within that range. For example, the description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 2.3, 3, 4, 5, 5.7 and 6. This applies regardless of the breadth of the range.

As used herein, terms such as "about," generally," "approximately," "substantially," and the like are intended to mean that slight variations from absolute are included within the scope of the structure or process recited. Additionally, the term "v/v" means volume of a given material relative to a volume of a total mixture which includes the material. For example, an oxidizing atmosphere having about 2% v/v oxygen means that the atmosphere includes 2 parts by volume of oxygen, relative to 100 parts of the total volume of the atmosphere. Similarly, the term "weight percent" means the weight of a given material relative to the weight of a total mixture which includes the material. For example, a dispersion having about 2 wt % carbon-based material means that the dispersion includes 2 parts by weight of the carbon-based material relative to 100 parts of the total weight of the dispersion.

Carbon-Based Materials

Figure 1A:
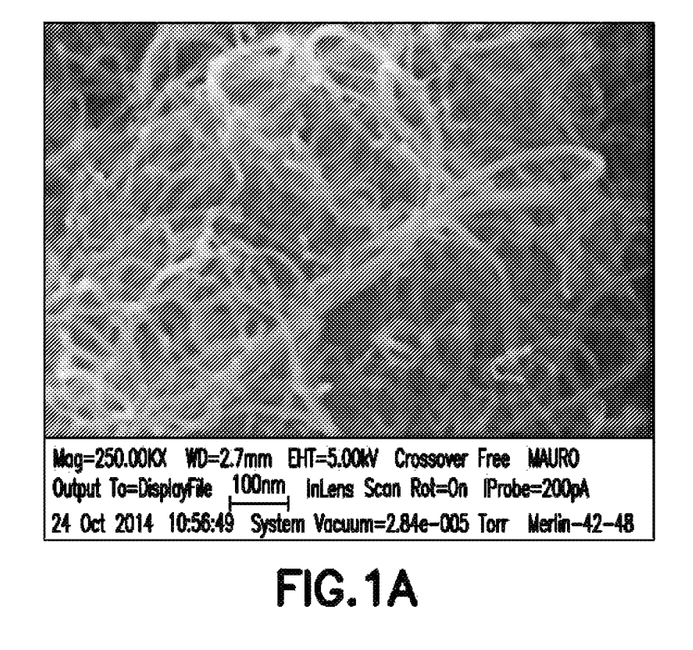
FIG. 1A is a scanning electron microscopy (SEM) micrograph of pristine multi-walled carbon nanotubes at a magnification of about 250,000×.
Figure 1B:
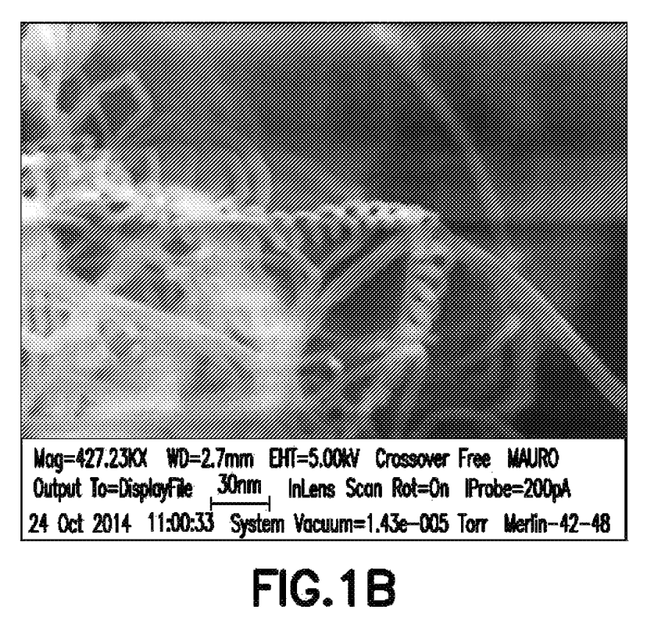
FIG. 1B is an SEM micrograph of pristine multi-walled carbon nanotubes at a magnification of about 427,000×.

The carbon-based materials used in the processes described herein may be micro- or nano-scale materials. In some embodiments, carbon-based materials may be formed from the carbon allotrope graphene, a planar array of sp2 bonded carbon atoms that form an interconnected network of five-, six- and seven-membered rings. Carbon-based materials may include high aspect ratio graphene cylinders, often referred to as carbon nanotubes. Carbon nanotubes may be classified as single- and multi-walled. Single-walled nanotubes are composed of a single graphitic cylinder in which the diameter may vary from about 0.7 nm to about 2 nm and the length may range from about 50 nm to several centimeters. Multi-walled nanotubes are composed of several concentric graphitic layers, the nanotubes having an overall diameter between about 10 nm and about 200 nm with lengths from about 1 micron to several centimeters. While a number of size ranges for the nanotubes have been included for illustrative purposes, this is not intended to limit the disclosure, as other preparations of carbon nanotubes may be used. Examples of carbon nanotubes that may be used in the processes described herein include NANOCYL® NC7000™, which are multi-walled carbon nanotubes available from Nanocyl SA of Sambreville, Belgium. Scanning electron microscopy micrographs of multi-walled carbon nanotubes are depicted in FIGS. 1A and 1B.

Figure 2A:
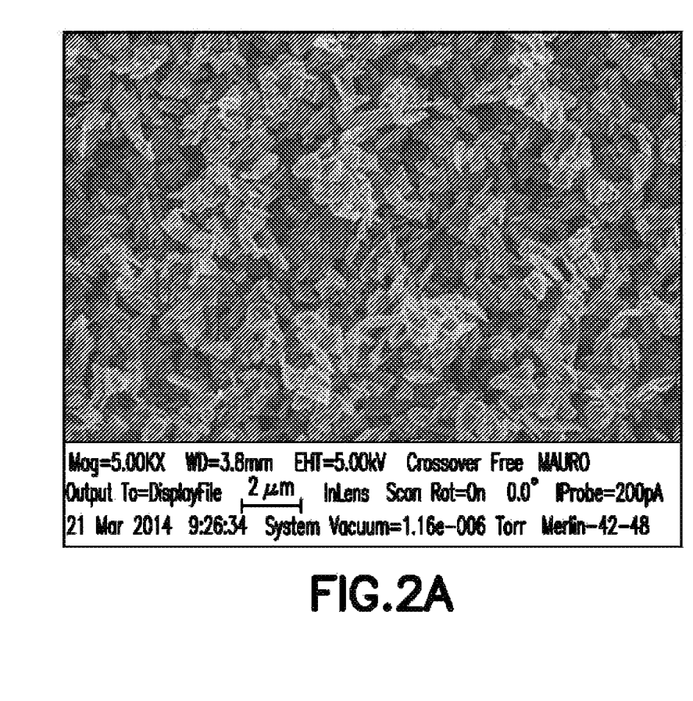
FIG. 2A is an SEM micrograph of pristine graphene nanoplatelets at a magnification of about 5,000×.
Figure 2B:
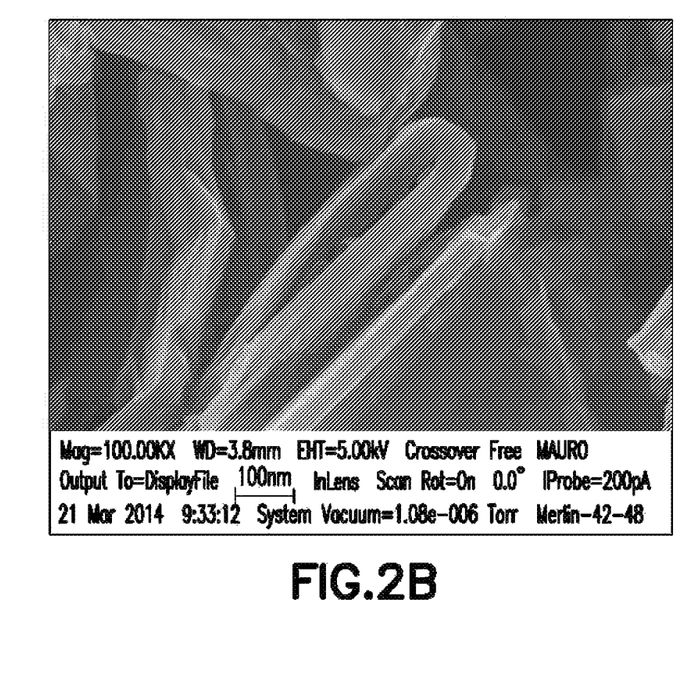
FIG. 2B is an SEM micrograph of pristine graphene nanoplatelets at a magnification of about 346,000×.

Other carbon-based materials that may be used in the processes described herein may include any member of the family of fullerenes, buckypaper, nanofiber, nanoplatelets, nano-onions, nanohorns, and functionalized derivatives thereof. The carbon-based materials can include hydrogen (H). The materials may also contain oxygen, for example, at the edges of the material, as well as interstitial and substitutional elements, such as boron, nitrogen or silicon, as a consequence of some high energy treatments and/or synthesis processes. Included among these materials are graphene nanoplatelets such as those available from Cheap Tubes, Inc. of Grafton, Vt. Scanning electron microscopy micrographs of graphene nanoplatelets are depicted in FIGS. 2A and 2B. The graphene nanoplatelets can include several sheets of graphene, wherein each sheet may have a thickness between about 3 nm and about 10 nm. The overall thickness of the graphene nanoplatelets may be on the order of about 100 nm.

Method of Preparing Dispersion

Figure 3:
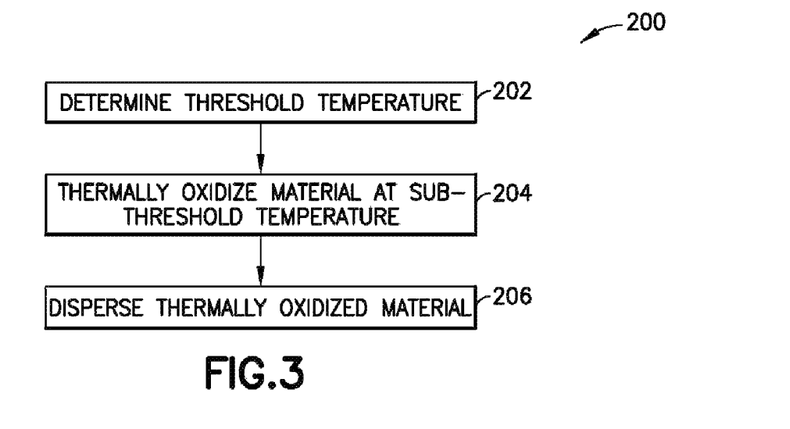
FIG. 3 is a flow chart depicting a method of preparing a dispersion of a thermally oxidized multi-walled carbon-based material.

A flow chart for a method 200 of preparing a dispersion of thermally oxidized carbon-based material is depicted in FIG. 3. The method may be performed using any number of carbon-based materials, and also may be performed using other hydrophobic materials that are not carbon-based, but that can be oxidized.

Figure 9:
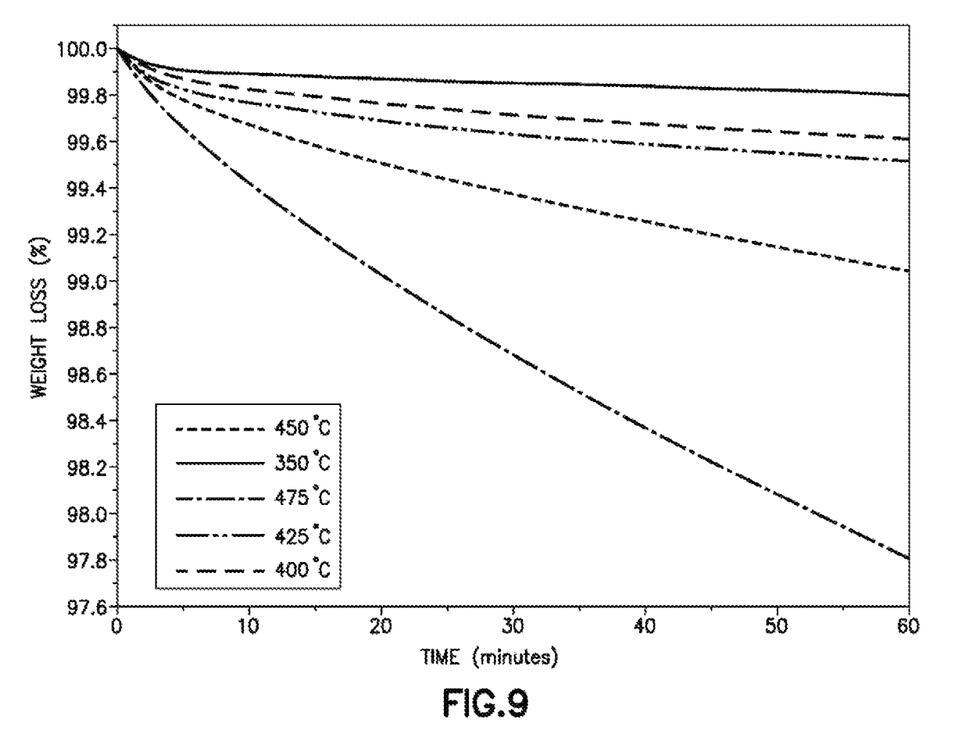
FIG. 9 is a graph showing weight loss over time for thermally oxidized graphene nanoplatelets under isothermal conditions.

Beginning at 202, a threshold temperature for the thermal oxidation of the specific carbon-based material being processed can be determined. As used herein, the term "threshold temperature" means, when the carbon-based material is heated in a given atmosphere, the temperature at which the carbon-based material first begins to lose weight, i.e., the first temperature at which the weight of the carbon-based material is less than its initial weight. In other words, the threshold temperature may be considered to be the temperature at which a curve of the derivative of weight loss as a function of temperature turns from zero to negative. In theory, the threshold temperature may be considered to be the temperature at which the sample begins to lose mass due to oxidation. In some embodiments, such as those depicted in FIGS. 5 and 9, the threshold temperature ranges from about 400° C. to about 475° C.

The threshold temperature may be determined by heating a sample of the carbon-based material having a known initial weight in a given oxidizing atmosphere over a range of temperatures and measuring the weight loss of the sample. The sample is heated at a heating rate from an initial temperature below the temperature at which the carbon-based material oxidizes to a final temperature above the temperature at which the carbon-based material oxidizes. In some embodiments, the heating rate ranges from about 1° C./min to about 10° C./min. In one embodiment, the heating rate is about 5° C./min. As the sample is heated, it is weighed at a plurality of temperatures, with the temperature increment between each weight measurement being about 10° C. or less, in other non-limiting examples between about 1° C. and about 10° C. One apparatus that may be used to perform the weight loss measurements is a thermogravametric analyzer (TGA). Thermogravametric analyzers include those manufactured by Mettler Toledo of Columbus, Ohio, such as the Mettler Toledo 1600. The threshold temperature may be determined from a graph of the weight loss data as a function of temperature, or by numerical methods known to one of ordinary skill in the art.

Figure 4:
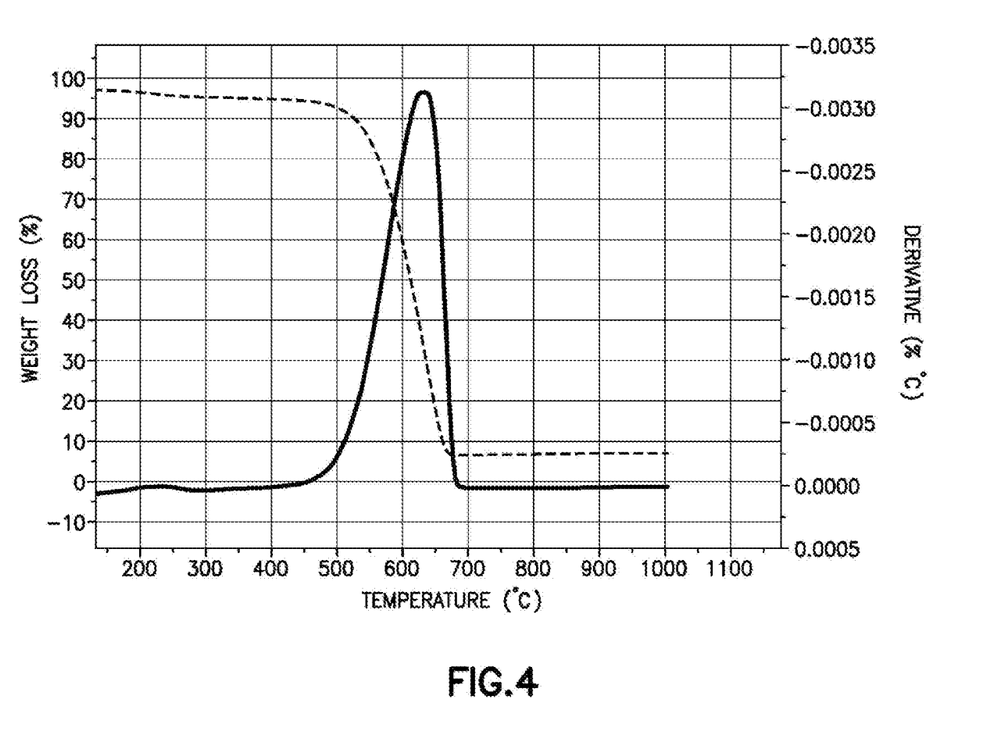
FIG. 4 is a graph showing both weight loss and derivatives thereof as a function of temperature for multi-walled carbon nanotubes.

For example, FIG. 4 is a graph showing weight loss and derivatives of the weight loss as a function of temperature as obtained from thermogravametric analysis of pristine multi-walled carbon nanotubes. For the specific material that is the subject of FIG. 4, the threshold temperature is about 450° C., which is seen to be the approximate temperature at which weight loss begins. The threshold temperature can change with crystal defectivity of the material. For example, multi-walled carbon nanotubes prepared by two distinct synthesis processes may have different crystal defectivities. Each time a different material is used, the threshold temperature should be determined.

As will be apparent from the Examples herein, which use multi-walled carbon nanotubes and graphene nanoplatelets as carbon-based materials, the threshold temperature can vary and may depend on the identity or particular batch of a given material. For example, a first batch of multi-walled carbon nanotubes may exhibit a different threshold temperature than a second batch of substantially the same multi-walled carbon nanotubes. Such difference may be due to a different size distribution of the carbon nanotubes in the batch, a different manufacturing process, a different level of amorphous carbon or impurity content, or the like. Similarly, carbon nanotubes can have a different threshold temperature than graphene nanoplatelets due to the different structures of these respective materials.

The oxidizing atmosphere should include a sufficient amount of oxygen to at least partially oxidize a surface of the carbon-based material at temperatures sufficient for oxidation to occur. For example, oxidation of the surface of the carbon-based material may include a chemical reaction on at least an outermost layer of the carbon-based material which can improve its hydrophilicity. In some embodiments, improved hydrophilicity may be achieved through at least partial functionalization of the surface of the carbon-based material with hydrophilic groups. Hydrophilic groups that may result from exposure to an oxidizing atmosphere include —OH, —C=O, —COOH, and epoxy groups.

The oxidizing atmosphere includes an oxidizing gas, such as oxygen in its pure form ($O_2$) and/or as a component of another gas, such as air, carbon monoxide (CO), nitrogen monoxide (NO), sulfur monoxide (SO), sulfur dioxide ($SO_2$), or combinations thereof. Non-oxygen containing oxidizing gases can be contemplated for use in the oxidizing atmosphere, provided these gases facilitate formation of oxygenated groups on surfaces of the carbon-based materials. In some embodiments, the oxidizing atmosphere can include CO, which is generally safe to use and produces fewer side effects. Side effects can include acidic and/or corrosive solution in contact with water. The amount of pure oxygen in the oxidizing atmosphere may be less than about 20% v/v; in some embodiments, less than about 15% v/v; in other embodiments, less than about 10% v/v; and in still other embodiments, less than about 5% v/v. In these last embodiments, the amount of oxygen in the oxidizing atmosphere may be between about 0.5% v/v and about 5% v/v, or between about 2% v/v and about 5% v/v. In one particular embodiment, the oxidizing atmosphere includes about 2% v/v of pure oxygen ($O_2$). At an oxygen content above about 20% v/v, the carbon-based material may be oxidized in an uncontrolled fashion, which can damage the material with a resultant loss of its mechanical/thermal/electrical properties. On the other hand, if the $O_2$ content is too low, an effective oxidation may not occur or the process time may become excessively long.

At sufficiently high temperatures, the oxidizing atmosphere used to determine the threshold temperature (202) could cause near complete or complete oxidation and destruction of the sample of carbon-based material used to make the determination. For example, at high temperatures, even an oxidizing atmosphere with a low content of oxygen, for example less than about 5% (v/v), can cause near complete oxidation of the sample material. However, in selecting the amount of oxygen to be included in the atmosphere (202), consideration may be given to the fact that the oxidizing atmosphere will be utilized to partially oxidize the surface of the carbon-based material in subsequent method 204 (discussed below) at a temperature below the threshold temperature.

The oxidizing atmosphere may include one or more second gases. Second gases may include gases that react with oxygen or with the carbon-based material to improve the hydrophilicity of the carbon-based material, gases that are inert in the presence of oxygen and the carbon-based material, and/or inert gases. Second gases can include nitrogen ($N_2$), argon (Ar), helium (He), carbon dioxide ($CO_2$), or combinations thereof. In some embodiments, the second gas is Ar, $N_2$, or a combination thereof. Typically, the oxidizing atmosphere will include a high percentage of one or more second gases.

The oxidizing atmosphere may include between about 80% v/v and about 99.5% v/v of the second gases; in some embodiments, between about 85% v/v and about 99.5% v/v of the second gases; in other embodiments, between about 90% v/v and about 99.5% v/v of the second gases; and in further embodiments, between about 95% v/v and about 99.5% v/v of the second gases. In one specific embodiment, the second gases are nitrogen and argon in amounts of about 8% v/v and about 90% v/v, respectively.

The carbon-based material may be thermally oxidized by exposure to the oxidizing atmosphere at an oxidation temperature for a selected amount of time (204). The oxidation temperature can be a temperature that is high enough to at least partially oxidize the carbon-based material to improve its hydrophilicity, but sufficiently below the threshold temperature so as to limit or prevent damage to the properties of the material, such as the mechanical properties, electrical properties, or other properties that typically may be damaged by oxidation. For example, at the oxidation temperature, the surface of the carbon-based material may be partially oxidized to add functional groups that can improve the hydrophilicity of the material in an aqueous medium. In contrast, at the threshold temperature, the structure of the carbon-based material may begin to break down, where functional groups are not added to the surface of the material, but the material surface is eroded through the formation of carbon-containing gases by reaction between the atmosphere and the surface of the material. The oxidation temperature may vary, for example, based on the specific carbon-based material being oxidized and the amount of oxygen in the oxidizing atmosphere. For example, the oxidation temperature may be below the threshold temperature by a greater amount when the oxidizing atmosphere has a higher content of oxygen. Further, the oxidation temperature may be selected based upon the degree of hydrophilicity desired in the carbon-based material. For example, the oxidation temperature may be selected to obtain a greater degree of hydrophilicity in the oxidized material, which may enable a higher concentration of the material to be dispersed in an aqueous media. In some embodiments, the oxidation temperature may be about 50° C. to about 100° C. below the threshold temperature; in other embodiments, about 60° C. to about 90° C. below the threshold temperature; and in still other embodiments, about 70° C. to about 80° C. below the threshold temperature. In some embodiments, such as those depicted in FIGS. 5 and 9, the oxidizing temperature ranges from about 350° C. to about 425° C.

In some embodiments, the thermal oxidation of the carbon-based material at the oxidation temperature may result in an overall weight loss of less than about 2% over the duration of exposure to the oxidizing atmosphere at the oxidation temperature. In other embodiments, the overall weight loss may be less than about 1%, and in still other embodiments, the overall weight loss may be less than about 0.5%.

The amount of time that the carbon-based material is exposed to the oxidizing conditions may be any suitable amount of time necessary to thermally oxidize the carbon-based material to improve its hydrophilicity. For example, the amount of time may be sufficient to obtain an overall weight loss as described in the preceding paragraph. In some embodiments, this may be less than about 2 hours, or between about 1 hour and about 2 hours, or less than about 1 hour. In other embodiments, the amount of time may be between about 10 min. and about 45 min.

The thermally oxidized carbon-based material is dispersed in a liquid medium (206). In some embodiments, the liquid medium may be an aqueous medium. In one particular embodiment, the liquid medium is water. However, other polar media are contemplated. Liquid media can include alcohols, tetrahydrofuran (THF), dimethyl sulfoxide (DMSO), acetone, or combinations thereof. The oxidized carbon-based material may be added to the liquid media in amounts between about 0.01% and about 0.5% by weight, based on the weight of the liquid media. In other embodiments, the oxidized carbon-based material may be added to the liquid media in amounts between about 0.05% and about 0.25% by weight, based on the weight of the liquid media. The oxidized carbon-based material and the liquid media may be mixed by any suitable method known in the art to disperse the material in the liquid media. Methods for dispersing the material may include stirring, tumbling, sonication, or combinations thereof. In some embodiments, the mixture (about 20 ml total volume) is sonicated for about 10 minutes or less using a tip sonicator (Vibra-Cell™, made by Sonics and Materials, Inc. of Newtown, Conn., USA) at a sonication power of about 70 to 100 watts.

EXAMPLES

Example 1

To begin, the threshold temperature for Nanocyl® NC 7000™ multi-walled carbon nanotubes was determined as follows. About 8 mg of the carbon nanotubes in a 150 μL alumina pot was placed in a Mettler Toledo 1600 TGA. The nanotubes were exposed to a gas mixture of about 2% v/v oxygen ($O_2$), about 8% v/v nitrogen ($N_2$), and about 90% v/v argon (Ar) at a flow rate of about 50 ml/min. The nanotubes were heated at a rate of about 10° C./min. The resulting weight loss data and corresponding derivative data are depicted in FIG. 4. As shown, the threshold temperature for this carbon-based material processed under these conditions is about 450° C. as determined by a visual inspection of the weight loss derivative data.

Figure 5:
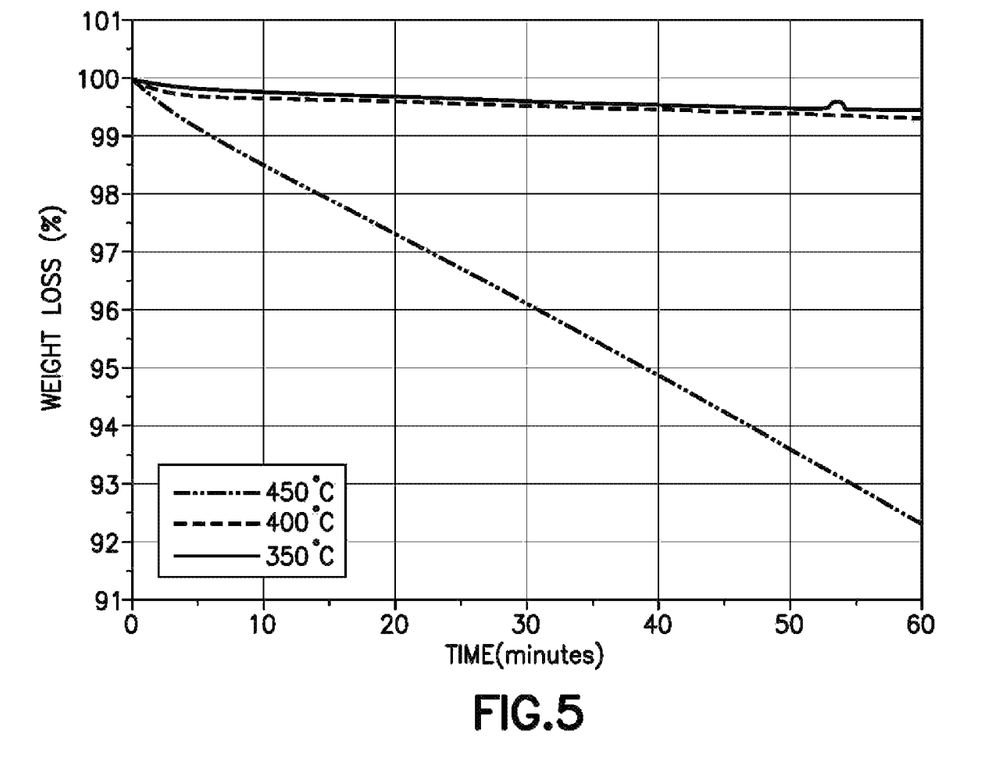
FIG. 5 is a graph showing weight loss over time for thermally oxidized multi-walled carbon nanotubes under isothermal conditions.
Figure 6A:
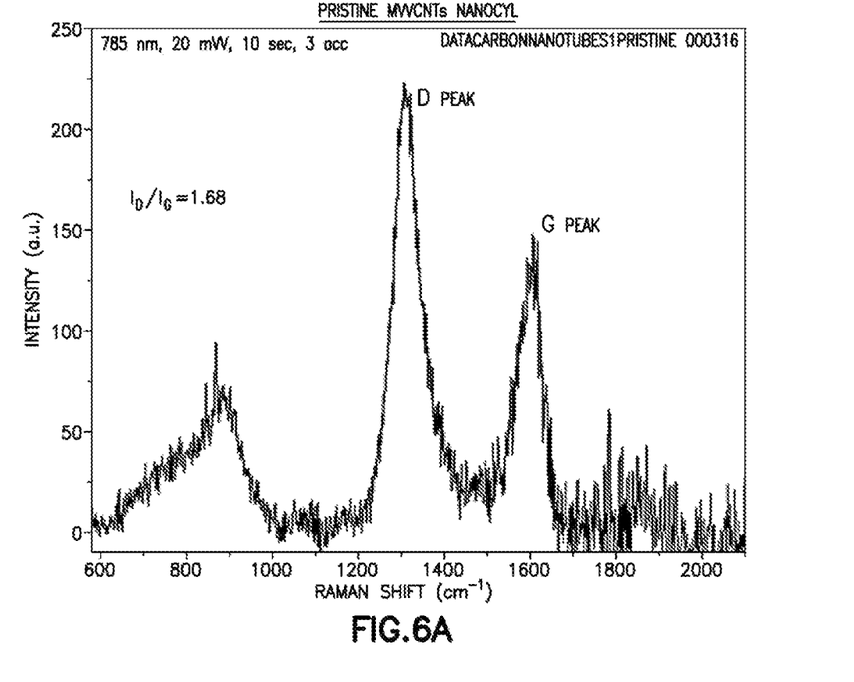
FIG. 6A is a Raman Spectrograph of pristine multi-walled carbon nanotubes.
Figure 6B:
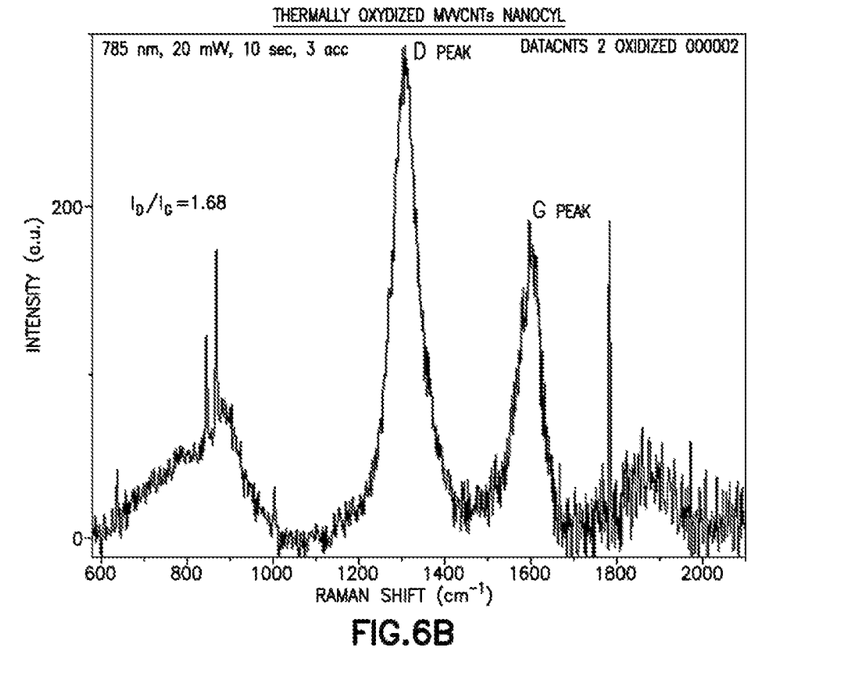
FIG. 6B is a Raman Spectrograph of the multi-walled carbon nanotubes of FIG. 6A after thermal oxidation.

8 mg of Nanocyl® NC 7000™ carbon nanotubes was then thermally oxidized at about 350° C., about 100° C. below the threshold temperature, for about 60 minutes using the same gas mixture, flow rate, and heating rate as used to obtain the threshold temperature. As shown in FIG. 5, under these sub-threshold temperature conditions, the overall weight loss after 60 minutes of thermal oxidation is less than about 1%. Moreover, Raman Spectroscopy (Kaiser Optical Systems, Inc. of Ann Arbor, Mich., USA, Invictus 785 nm diode laser, spectra acquired at 20 mW, 10 seconds, 3 accumulations) confirms that the oxidized nanotubes were not measurably damaged by these oxidation conditions. FIGS. 6A and 6B depict Raman spectra of the pristine carbon nanotubes (i.e., prior to thermal oxidation) and the oxidized nanotubes, respectively. The ratio of intensity of the D peak to the G peak in both spectra is about 1.68, confirming that the nanotubes are not measurably damaged by the aforementioned thermal oxidation process. The correlation between peaks in Raman Spectra and defects in carbon-based materials is discussed in any of the following, M. S. Dresselhaus, G. Dresselhaus, A. Jorio, A. G. Souza Filho, R. Saito, Carbon 40, 2043 (2002); M. S. Dresselhaus, G. Dresselhaus, R. Saito, A. Jorio, Phys. Rep. 409, 47 (2005); R. Vidano, D. B. Fishbach, J. Am. Ceram. Soc. 61 (1-2), 13 (1978); F. Tunistra, J. L. Koenig, J. Chem. Phys. 53, 1126 (1970); T. C. Chieu, M. S. Dresselhaus, M. Endo, Phys. Rev., B, Condens. Matter 26 (10), 5867 (1982); Y. J. Lee, J. Nucl. Mater. 325, 174 (2004); Y. Sato, M. Kamo, N. Setaka, Carbon 16, 279 (1978), which are incorporated herein in their entirety by reference.

Figure 7:
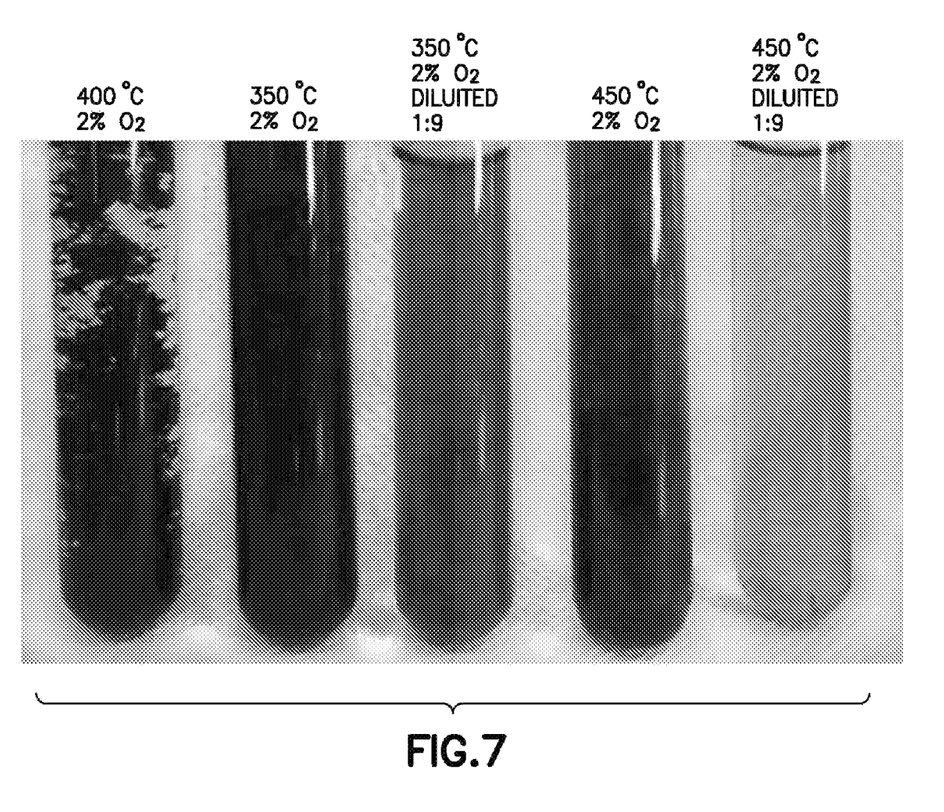
FIG. 7 shows examples of dispersions of thermally oxidized multi-walled carbon nanotubes in ultrapure water for different thermal oxidation processing parameters.

8 mg of the thermally oxidized carbon nanotubes were then dispersed in about 20 mL of ultrapure water, available from Silma Chimica S.R.L., of Sumirago (VA), Italy, and sonicated using a Vibra-cell™ tip sonicator, available from Sonics and Materials, Inc. of Newton, Conn., USA, for about 10 minutes at a sonication power of about 70 to about 100 watts. The resulting dispersion was further diluted by a ratio of 1:9 with ultrapure water. The dispersion and the diluted dispersion are depicted in FIG. 7. The dark contrast in the diluted dispersion confirms that the oxidized carbon nanotubes are efficiently dispersed in water.

Example 2

8 mg of the same Nanocyl® NC7000™ carbon nanotubes as were used in Example 1 was thermally oxidized at a temperature of about 400° C., about 50° C. below the threshold temperature determined above, for about 60 minutes using the same gas mixture, flow rate, and heating rate as in Example 1. As shown in FIG. 5, under these sub-threshold temperature conditions, the overall weight loss after 60 minutes of thermal oxidation is less than about 1%. Moreover, Raman Spectroscopy (not shown) yielded similar results to those for Example 1 in terms of defect content when compared to pristine carbon nanotubes.

A dispersion using a starting amount of 8 mg of these thermally oxidized carbon nanotubes were prepared in the same manner as in Example 1. The dispersion is depicted in FIG. 7. The bundling in the dispersion when compared to the dispersion of Example 1 may indicate that the oxidized carbon nanotubes of Example 2 are not as efficiently dispersed as those of Example 1, suggesting that excess oxidation, compared to Example 1, burns down the more sensitive material, and the more stable material doesn't get sufficiently oxidized, resulting in less material being dispersed. As used herein, 'sensitive material' may be a material that reacts quickly to an oxidizing gas, such as amorphous carbon or defects present in the surface of the carbon-based material. In contrast, a "stable material" may be a material that does not react quickly, such as a graphitic material that is generally free of defects.

Comparative Example 1

In contrast to Examples 1 and 2, 8 mg of the same Nanocyl® NC7000™ carbon nanotubes as were used in Example 1 was thermally oxidized at a temperature of about 450° C., the threshold temperature, for 60 minutes using the same gas mixture, flow rate, and heating rate as in Example 1. As shown in FIG. 5, the overall weight loss after 60 minutes at threshold temperature conditions is about 7-8%. Moreover, Raman Spectroscopy (not shown) confirmed that the oxidized carbon nanotubes are measurably damaged at these oxidation temperatures compared to the pristine carbon nanotubes.

A dispersion and a diluted dispersion using a starting amount of 8 mg of these thermally oxidized carbon nanotubes were prepared in the same manner as in Example 1. The dispersion and the diluted dispersion are depicted in FIG. 7. The light contrast in the diluted dispersion confirms that the oxidized carbon nanotubes are not efficiently dispersed in water, suggesting the sensitive material has been over oxidized, leaving the stable material with less oxidized groups to aide dispersion in water.

Example 3

Figure 8:
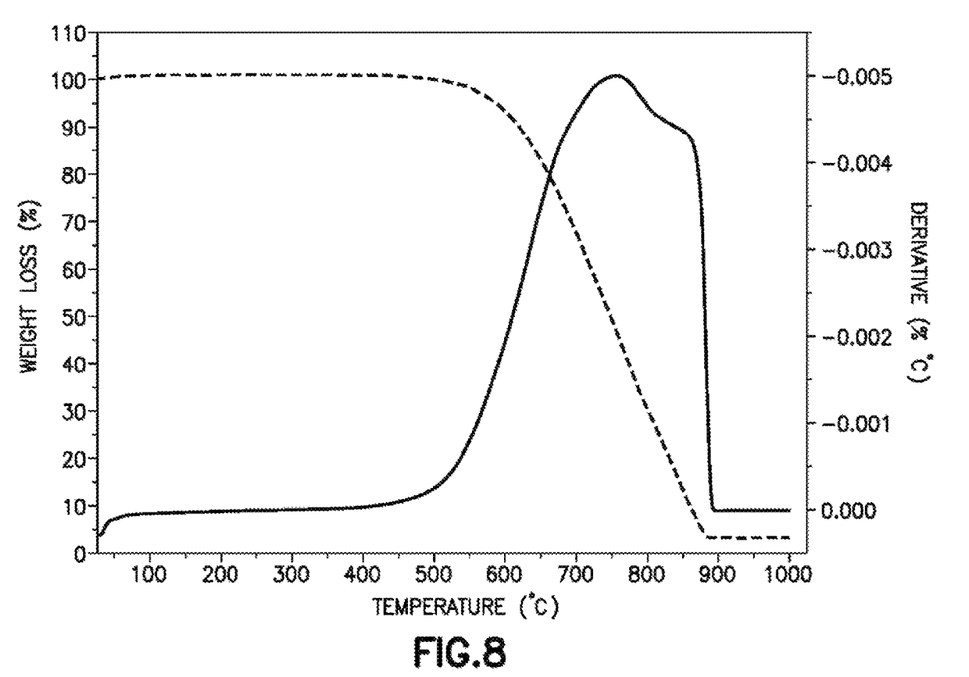
FIG. 8 is a graph showing both weight loss and derivatives thereof as function of temperature for graphene nanoplatelets.
Figure 10A:
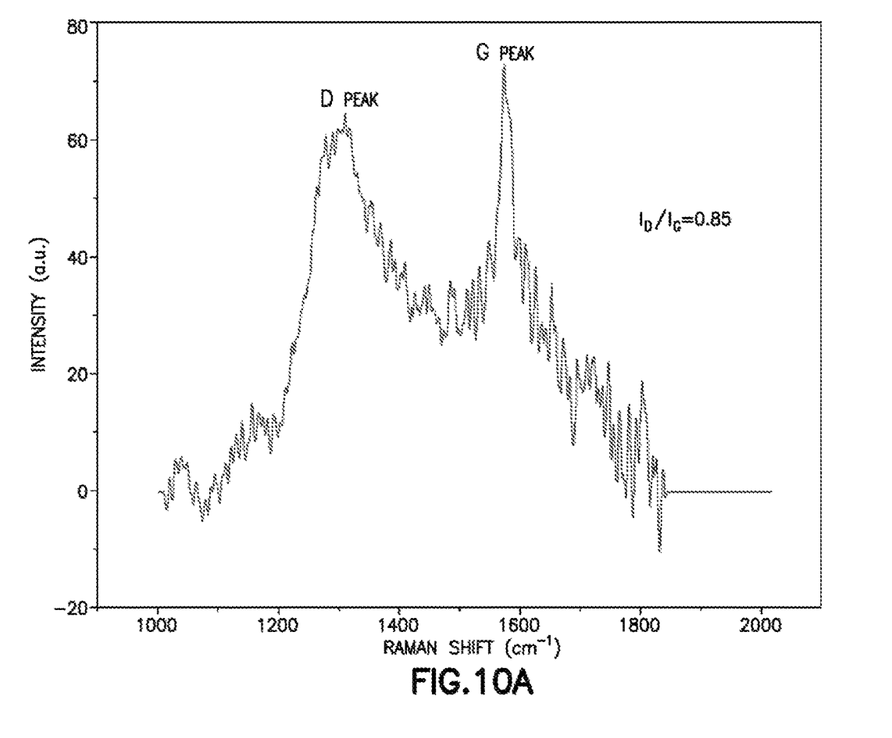
FIG. 10A is a Raman Spectrograph of pristine graphene nanoplatelets.
Figure 10B:
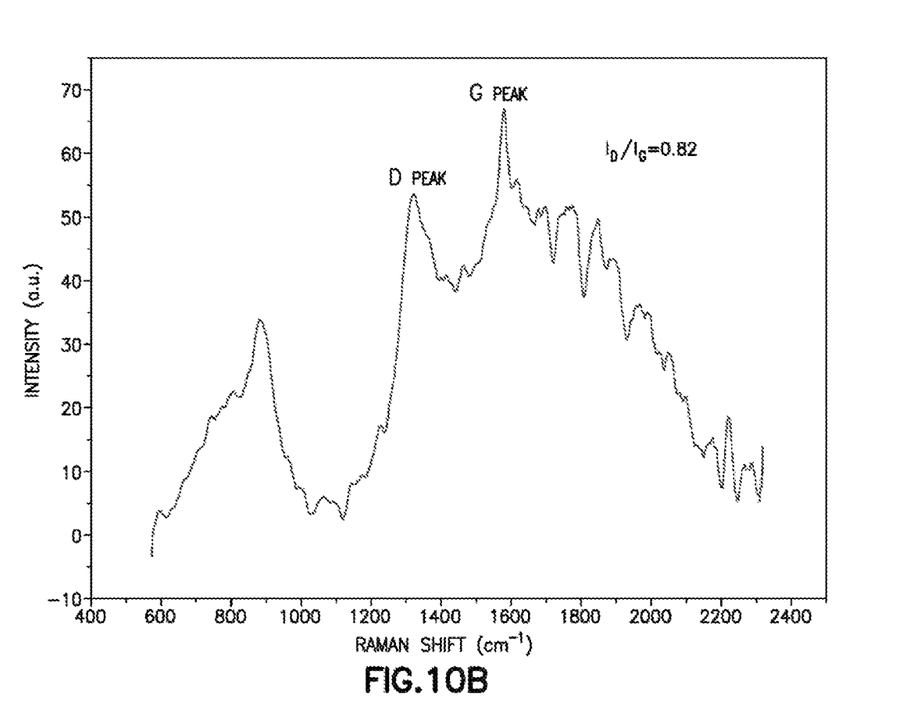
FIG. 10B is a Raman Spectrograph of the graphene nanoplatelets of FIG. 10A after thermal-oxidation.

About 8 mg of graphene nanoplatelets (available from Cheaptubes, Inc. of Grafton, Vt.) was oxidized and analyzed using the same conditions and methods as in Example 1, except that the graphene nanoplatelets were heated at a rate of about 5° C./min. The resulting weight loss data and corresponding derivative data are depicted in FIG. 8. As shown in FIG. 8, the threshold temperature is between about 425° C. and about 450° C. as determined by a visual inspection of the weight loss data. Moreover, Raman Spectroscopy (conducted in the same manner as in Example 1) confirms that the oxidized nanoplatelets were not measurably damaged by these oxidation conditions. FIGS. 10A and 10B depict Raman spectra of the pristine nanoplatelets (i.e., prior to thermal oxidation) and the oxidized nanoplatelets, respectively. The ratio of intensity of the D peak to the G peak in both spectra is about 0.85 and about 0.82, respectively, confirming that the nanoplatlets are not measurably damaged by the aforementioned thermal oxidation process.

Embodiments of the disclosure may be used in oilfield applications to assist the dispersion of carbon nanotubes in cement. Incorporating a small amount (as low as 0.1% in weight) of carbon nanotubes and carbon fibers in Oilwell cement will produce an electric conductive network in the cement nanocomposite. As both carbon nanotubes and carbon fibers exhibit piezoresistive electrochemical properties, these conductive networks can be used in sensing mechanical stresses. In fact, when subjected to stress/strain, carbon nanotubes show electrical properties which change with the level of stress/strain, expressing a linear and reversible piezoresistive response. Carbon nanotubes may be used in cement composites as embedded stress sensors in oilfield applications to measure mechanical stress and formation of microcracks. This is useful to prevent or minimize issues related with cement sheath failure in the annulus between casing and formation. Further details of piezoresistive cement nanocomposites may be found in U.S. application Ser. No. 15/036,975, entitled "Piezoresistive cement nanocomposites", the contents of which are herein incorporated by reference. Thermal oxidation of carbon nanotubes will aid the dispersion of these carbon nanotubes in cement used in oilfield applications.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of preparing a dispersion of a carbon-based material, comprising:
   exposing the carbon-based material to an atmosphere comprising between about 0.5% v/v and about 2.0% v/v of oxygen for a selected time at an oxidation temperature to obtain a thermally oxidized material, wherein the atmosphere wherein the atmosphere further comprises about 8% v/v nitrogen ($N_2$), and about 90% v/v % v/v of argon (Ar); and
   dispersing the thermally oxidized material in a liquid medium.

2. The method of claim 1, wherein the selected time is between about 10 minutes and about 2 hours.

3. The method of claim 1, wherein the oxidizing temperature is between about 350° C. and about 425° C.

4. The method of claim 1, wherein the carbon-based material is a multi-layered graphene or graphene-like material.

5. The method of claim 1, wherein the carbon-based material is selected from the group consisting of multi-walled carbon nanotubes, graphene, and graphene nanoplatelets.

6. The method of claim 1, wherein the atmosphere includes an oxidizing gas selected from the group consisting of air, oxygen ($O_2$), carbon monoxide (CO), nitrogen monoxide (NO), sulfur monoxide (SO), sulfur dioxide ($SO_2$), and combinations thereof.

7. The method of claim 1, further comprising:
   determining the oxidizing temperature prior to the exposing.

8. The method of claim 7, wherein the determining comprises:
   exposing a test sample of the carbon-based material having a known initial weight to the atmosphere;
   heating the test sample at a heating rate from an initial temperature below the temperature at which the carbon-based material oxidizes to a final temperature above the temperature at which the carbon-based material oxidizes; and weighing the test sample during the heating at a plurality of temperatures between the initial temperature and the final temperature, wherein a temperature increment between each weighing is about 10° C. or less;

determining as a threshold temperature the first temperature at which the weight of the test sample is less than the initial weight;

selecting as the oxidizing temperature a temperature that is between about 50° C. and about 100° C. below the threshold temperature.

9. The method of claim 8, wherein the temperature increment between each weighing is between about 1° C. and about 5° C.

10. The method of claim 8, wherein the weight of the test sample at the threshold temperature is less than about 1 wt % less than the initial weight of the test sample.

11. The method of claim 8, wherein the oxidizing temperature is between about 350° C. and about 425° C.

12. The method of claim 8, wherein the heating rate is between about 1° C./min. and about 10° C./min.

13. The method of claim 1, wherein the dispersing includes:
sonicating the thermally oxidized material in the liquid medium.

14. The method of claim 1, wherein the liquid medium is water.

15. The method of claim 1, wherein a concentration of the thermally oxidized material in the liquid medium is between about 0.01 wt % and about 0.5 wt % of the total weight of the liquid medium.

16. A method of preparing a dispersion of a carbon-based material, comprising:
determining a threshold temperature at which a specific carbon-based material begins to oxidize in a given atmosphere;
exposing the carbon-based material to the given atmosphere at an oxidation temperature less than the threshold temperature for a time sufficient to at least partially oxidize the carbon-based material, wherein the given atmosphere further comprises about 8% v/v nitrogen ($N_2$), and about 90% v/v % v/v of argon (Ar); and
dispersing the at least partially oxidized carbon-based material in an aqueous medium.

17. A method of preparing a dispersion of a carbon-based material, comprising:
exposing the carbon-based material to an atmosphere comprising between about 0.5% v/v and about 5.0% v/v of oxygen for a selected time at an oxidation temperature to obtain a thermally oxidized material;
dispersing the thermally oxidized material in a liquid medium; and
determining the oxidizing temperature prior to the exposing, wherein determining comprises exposing a test sample of the carbon-based material having a known initial weight to the atmosphere; heating the test sample at a heating rate from an initial temperature below the temperature at which the carbon-based material oxidizes to a final temperature above the temperature at which the carbon-based material oxidizes; and weighing the test sample during the heating at a plurality of temperatures between the initial temperature and the final temperature, wherein a temperature increment between each weighing is about 10° C. or less; determining as a threshold temperature the first temperature at which the weight of the test sample is less than the initial weight; and selecting as the oxidizing temperature a temperature that is between about 50° C. and about 100° C. below the threshold temperature.

18. The method of claim 17, wherein at least one of the temperature increment between each weighing is between about 1° C. and about 5° C., the heating rate is between about 1° C./min. and about 10° C./min, or both.

19. The method of claim 17, wherein the weight of the test sample at the threshold temperature is less than about 1 wt % less than the initial weight of the test sample.

20. The method of claim 17, wherein the oxidizing temperature is between about 350° C. and about 425° C.

* * * * *